(12) United States Patent
Tsujio

(10) Patent No.: US 9,079,450 B2
(45) Date of Patent: Jul. 14, 2015

(54) PLASTIC ERASER, PLASTIC ERASER COMPOSITE BODY, AND METHOD FOR PRODUCING THEREOF

(75) Inventor: Shinji Tsujio, Osaka (JP)

(73) Assignee: SAKURA COLOR PRODUCTS CORPORATION, Osaka (JP)

( * ) Notice: Subject to any disclaimer, the term of this patent is extended or adjusted under 35 U.S.C. 154(b) by 137 days.

(21) Appl. No.: 14/007,209

(22) PCT Filed: Mar. 23, 2012

(86) PCT No.: PCT/JP2012/057419
§ 371 (c)(1),
(2), (4) Date: Nov. 25, 2013

(87) PCT Pub. No.: WO2012/128337
PCT Pub. Date: Sep. 27, 2012

(65) Prior Publication Data
US 2014/0082885 A1 Mar. 27, 2014

(30) Foreign Application Priority Data
Mar. 24, 2011 (JP) ................. 2011-065256

(51) Int. Cl.
*B43L 19/00* (2006.01)
*C08K 5/1515* (2006.01)
*C08L 27/06* (2006.01)

(52) U.S. Cl.
CPC ......... *B43L 19/0025* (2013.01); *B43L 19/0087* (2013.01); *C08K 5/1515* (2013.01); *C08L 27/06* (2013.01)

(58) Field of Classification Search
CPC ............ B42L 19/0025; B42L 19/0087; C08K 5/1515; C08L 27/06
USPC .......................................... 524/287
See application file for complete search history.

(56) References Cited

U.S. PATENT DOCUMENTS

| | | | |
|---|---|---|---|
| 7,316,841 | B1 | 1/2008 | Hayashi et al. |
| 2007/0065654 | A1 | 3/2007 | Hayashi et al. |

FOREIGN PATENT DOCUMENTS

| | | |
|---|---|---|
| JP | 62-104800 | 5/1987 |
| JP | 9-175087 | 7/1997 |
| JP | 2001-81259 | 3/2001 |
| JP | 2001-138688 | 5/2001 |
| JP | 2003-105150 | 4/2003 |
| JP | 2005-138359 | 6/2005 |
| JP | 2007-21768 | 2/2007 |
| JP | 2011-110894 | 6/2011 |
| WO | WO 2009/145132 | 12/2009 |

*Primary Examiner* — Angela C Scott
(74) *Attorney, Agent, or Firm* — Hamre, Schumann, Mueller & Larson, P.C.

(57) ABSTRACT

The invention provides a plastic eraser comprising a vinyl chloride resin as a base resin and a combination of 4,5-epoxy-1,2-cyclohexanedicarboxylic acid bis(2-ethylhexyl) and diethylene glycol dibenzoate as plasticizers, wherein the plastic eraser comprises the base resin in an amount of 25-60% by weight, and the combination of plasticizers in an amount of 30-60% by weight, and wherein the proportion of the diethylene glycol dibenzoate in the combination of plasticizers is 5-60% by weight, and wherein the plastic eraser has a hardness in the range of 55-75, and a gel hardness in the range of 3.0-6.0 kgf.

5 Claims, No Drawings

PLASTIC ERASER, PLASTIC ERASER COMPOSITE BODY, AND METHOD FOR PRODUCING THEREOF

FIELD OF THE INVENTION

The present invention relates to a plastic eraser. More particularly, the invention relates to a plastic eraser which has a superior erasing performance and an extremely low environmental load. The invention further relates to a plastic eraser composite body which comprises a porous structure formed of an organic polymer and the plastic eraser contained therein, and a method for producing the plastic eraser composite body.

BACKGROUND ART

Conventionally a plastic eraser has been usually produced by adding a plasticizer, and if needed, other additives such as a stabilizer and a colorant, to a base resin to prepare a uniform mixture, and heating and molding the mixture using a suitable molding means.

In such a conventional plastic eraser as mentioned above, a vinyl chloride resin is most widely used as a base resin, and a phthalate ester plasticizer such as dioctyl phthalate and dibenzyl phthalate is most widely used as a plasticizer.

However, in recent years, it is pointed out that such a phthalate ester plasticizer as mentioned above has a possibility that it would act as the so-called environmental hormone (endocrine disruptors). Such being the case, a new plasticizer for the plastic eraser which would replace the conventional phthalate ester plasticizer is demanded.

Thus, for example, a plastic eraser has been proposed which uses such a non-phthalate ester plasticizer as acetyltributyl citrate (see Patent Document 1), 4,5-epoxy-1,2-cyclohexanedicarboxylic acid bis(2-ethylhexyl) (see Patent Document 2), sebacic acid diester (see Patent Document 3), and an alkylsulfonic acid phenyl ester (see Patent Document 4).

Furthermore, in a plastic eraser which uses urethane resin as a base resin, the use of combination of non-phthalate ester plasticizers such as 4,5-epoxy-1,2-cyclohexanedicarboxylic acid bis(2-ethylhexyl) and a dialkylene glycol benzoate is also proposed (see Patent Document 5).

A plastic eraser composite body is also proposed in recent years. The plastic eraser composite body comprises a porous structure formed of an organic polymer and having pores therein, and a plastic eraser contained in the pores. When writings provided on the surface of paper are rubbed and erased with the plastic eraser composite body, the eraser is worn on the surface of the paper while the skeletal structure of the porous structure is also broken on the surface of the eraser at which it is worn, thereby it is superior not only in erasing performance but also in eraser scraps integrating property (see Patent Document 6).

However, as to a plastic eraser which comprises a vinyl chloride resin as a base resin, there has not yet been proposed any non-phthalate ester plasticizer which is effective from the viewpoint of reduction of environmental load and improvement in erasing performance.

PRIOR ART DOCUMENTS

Patent Documents

[Patent Document 1] JP 2003-105150 A
[Patent Document 2] JP 2001-81259 A
[Patent Document 3] JP 2007-21768 A
[Patent Document 4] JP 2005-138359 A
[Patent Document 5] WO 2009/145132
[Patent document 6] JP 2001-138688 A

SUMMARY OF THE INVENTION

Problems to be Solved by the Invention

The invention has been made in order to solve the problems involved in a conventional plastic eraser, in particular, one which comprises a vinyl chloride resin as a base resin. Therefore, it is an object of the invention to provide a plastic eraser which has a superior erasing performance and an extremely low environmental load. It is a further object of the invention to provide a plastic eraser composite body which comprises a porous structure formed of an organic polymer and having pores therein, and the plastic eraser contained in the pores. It is also an object of the invention to provide a method for producing the plastic eraser composite body.

Means for Solving the Problems

The invention provides a plastic eraser which comprises a vinyl chloride resin as a base resin and a combination of 4,5-epoxy-1,2-cyclohexanedicarboxylic acid bis(2-ethylhexyl) and diethylene glycol dibenzoate as plasticizers, wherein the plastic eraser comprises the base resin in an amount of 25-60% by weight, and the combination of plasticizers in an amount of 30-60% by weight, and wherein the proportion of the diethylene glycol dibenzoate in the combination of plasticizers is 5-60% by weight, and wherein the plastic eraser has a hardness in the range of 55-75, and a gel hardness in the range of 3.0-6.0 kgf.

According to the invention, it is preferred that the plastic eraser comprises the combination of plasticizers in an amount of 35-55% by weight, and the proportion of the diethylene glycol dibenzoate in the combination of plasticizers is 10-50% by weight, The invention also provides a plastic eraser composite body which comprises a porous structure formed of an organic polymer and having pores therein, and the plastic eraser contained in the pores.

The invention further provides a method for producing the plastic eraser composite body, which comprises impregnating a porous structure formed of an organic polymer and having pores therein with a plastisol to fill the pores with the plastisol, and heating the resulting product to cure the plastisol, wherein the plastisol comprises a vinyl chloride resin as a base resin in an amount of 25.60% by weight and a combination of 4,5-epoxy-1,2-cyclohexanedicarboxylic acid bis(2-ethylhexyl) and diethylene glycol dibenzoate as plasticizers in an amount of 30-60% by weight, and wherein the proportion of the diethylene glycol dibenzoate in the combination of plasticizers is 5-60% by weight.

EMBODIMENTS OF THE INVENTION

The plastic eraser of the invention comprises a vinyl chloride resin as a base resin and a combination of 4,5-epoxy-1, 2-cyclohexanedicarboxylic acid bis(2-ethylhexyl) and diethylene glycol dibenzoate as a plasticizer, wherein the plastic eraser comprises the base resin in an amount of 25-60% by weight, and the combination of plasticizers in an amount of 30-60% by weight, and wherein the proportion of the diethylene glycol dibenzoate in the combination of plasticizers is 5-60% by weight, and wherein the plastic eraser has a hardness in the range of 55-75, and a gel hardness in the range of 3.0-6.0 kgf.

Herein the invention, the hardness is a strength with which a plastic eraser repels reversibly to external force applied thereto. The gel hardness is a magnitude of external force which destroys irreversibly the gel which forms a plastic eraser.

The plastic eraser of the invention employs a vinyl chloride resin as a base resin. The vinyl chloride resin refers to polyvinyl chloride and vinyl chloride copolymers. The vinyl chloride copolymer refers to a copolymer of vinyl chloride and a radical-polymerizable monomer which is copolymerizable with vinyl chloride. The radical-polymerizable monomer which is copolymerizable with vinyl chloride is not limited to specific ones, and includes, for example, ethylene, vinyl acetate, vinyl fluoride, vinylidene chloride, methyl vinyl ether, (meth)acrylic acid, ethyl (meth)acrylate, maleic anhydride, acrylonitrile, styrene, etc. In the invention, vinyl chloride-ethylene copolymer and vinyl chloride-vinyl acetate copolymer may be mentioned as a typical vinyl chloride copolymer, for example.

Polyvinyl chloride is in particular preferably used as the base resin, and it is used as paste-like plastisol which is prepared by dissolving polyvinyl chloride in a plasticizer so that it may readily provide a plastic eraser by a molding method.

According to the invention, a combination of 4,5-epoxy-1,2-cyclohexanedicarboxylic acid bis(2-ethylhexyl) and diethylene glycol dibenzoate is used as plasticizers. In the combination of 4,5-epoxy-1,2-cyclohexanedicarboxylic acid bis(2-ethylhexyl) and diethylene glycol dibenzoate, the proportion of diethylene glycol dibenzoate is in the range of 5-60% by weight, preferably in the range of 10-50% by weight, and most preferably in the range of 15-45% by weight.

When the proportion of diethylene glycol dibenzoate in the combination of 4,5-epoxy-1,2-cyclohexanedicarboxylic acid bis(2-ethylhexyl) and diethylene glycol dibenzoate is too small, the resulting plastic eraser has a low gel hardness and is liable to crack when used in erasing. However, when the proportion of diethylene glycol dibenzoate is too high, the resulting plastic eraser is also too high in gel hardness, resulting in reduction of erasing performance.

Further according to the invention, the plastic eraser comprises the combination of 4,5-epoxy-1,2-cyclohexanedicarboxylic acid bis(2-ethylhexyl) and diethylene glycol dibenzoate as plasticizers in an amount of 30-60% by weight, preferably in an amount of more than 30% by weight and up to 60% by weight, and more preferably in an amount of 35-55% by weight, and most preferably in an amount of 40-55% by weight. When the amount of the combination of the plasticizers is too small, the resulting plastic eraser has a high hardness and is reduced in elasticity so that it is low in erasing performance, and in addition, it is not good in feeling when it is used. On the other hand, when the amount of the combination of the plasticizers is too large, the resulting plastic eraser has increased frictional resistance, and has bad feeling when it is used.

The plastic eraser of the invention preferably contains a filler so that it may have an appropriate hardness. Conventionally known fillers may be used, such as calcium carbonate, magnesium carbonate, magnesium oxide, silica, talc, clay, diatomaceous earth, quartz powder, alumina, aluminium silicate, mica, sericite, montmorillonite, etc. Although not limited in particular, the amount of the filler in the plastic eraser is usually 50% by weight or less, and preferably in the range of 5-50% by weight. When the amount of the filler in the plastic eraser is too small, the resulting plastic eraser is liable to deform easily rather than to be worn when it is used. When the amount is too large, the resulting plastic eraser has a high hardness so that it is reduced in elasticity.

The plastic eraser of the invention may contain a stabilizer so that it is prevented from degradation of the base resin at high temperature circumstances. The stabilizer usable includes, for example, a barium-zinc stabilizer, a calcium-zinc stabilizer, a magnesium-zinc stabilizer, etc.

In addition to the fillers and stabilizers mentioned above, the plastic eraser of the invention may contain other additives, such as a viscosity controlling agent, a lubricant, a solvent, a colorant, a ultraviolet ray absorbent, an antiseptic, an antifungal agent, an aromatic, and so on, if needed. Although the amount of the additives mentioned above is not limited and it is usually 5% by weight or less, and preferably 0.3% by weight or less.

The plastic eraser of the invention is not specifically limited in a method for producing. When an injection method is employed, for example, the plastic eraser of the invention can be obtained as follows. A base resin and a plasticizer, and if necessary, a filer, a lubricant, a colorant, an antiseptic, an antifungal agent, an aromatic, etc. are mixed together to prepare a plastisol. The plastisol is then injected into a mold, heated so that it is cured, cooled, and cut to a suitable length, thereby providing a plastic eraser. However, a method for producing the plastic eraser of the invention is not limited to a specific one such as mentioned above, and it can be also produced by any method such as extrusion molding, injection molding, and press forming.

According to the invention, a plastic eraser composite body is obtained by filling the plastic eraser set forth above in the pores of a porous structure formed of an organic polymer. The porous structure formed of an organic polymer is already known (see Patent Document 6). The porous structure has a skeletal structure or a three dimensional network structure formed of an organic polymer and has three dimensionally communicating pores (referred to also as open cells). The skeletal structure has a roll of reinforcing the plastic eraser in the plastic eraser composite body. Moreover, when writings on paper are rubbed and erased with the plastic eraser composite body, the skeletal structure is broken at portions with which the writings on paper are rubbed and erased, and the resulting fragments of the skeletal structure integrate or collect scraps of its own with scraps of plastic eraser produced on the paper.

In the porous structure formed of an organic polymer, the thickness of the wall of the skeletal structure (namely, the wall or skeleton which forms pores) is in average in the range of 1-100 μm, preferably in the range of 10-50 μm, although it is not specifically limited, and the size of the pores which the skeletal structure has is in average in the range of 10 μm to 3 mm, preferably in the range of 20 μm to 1 mm, although it is not specifically limited.

The voids (porosity) of the porous structure are 60% or more, preferably 80% or more, and more preferably 90% or more, for example, in the range of 90-99.8%.

The plastic eraser composite body of the invention is a composite body which comprises such a porous structure having pores therein as mentioned above and the plastic eraser filled in the pores. The filling rate of plastic eraser in the total volume of the pores of the porous structure is usually not less than 50% and less than 100%, preferably in the range of 70-90%, and most preferably about 85% so that the resulting composite body is well balanced in eraser scraps integrating performance, erasing performance and feeling when used.

According to the invention, the porous structure has a tensile strength of 3 kgf/cm$^2$ or less, and preferably of 2 kgf/cm$^2$ or less. When the porous structure has a tensile strength of more than 3 kgf/cm$^2$, the skeletal structure of the resulting composite body is hardly broken at portion where the plastic eraser is applied onto paper even if the eraser is worn out at the portions. The tensile strength shall be measured in accordance with JIS K 6402 with a sample having a thickness of 10 mm having a dumbbell form of No. 2, and a testing speed of 300 mm/min.

The porous structure has an elongation of 500% or less, preferably 100% or less. When the plastic eraser composite body having a porous structure of which elongation is more than 500% is used in erasing, the worn face of the plastic eraser and the separating face of the skeletal structure fail to coincident with each other while erasing, thereby allowing the porous structure of the skeletal structure to rise from the worn face, and giving adverse effects on the external appearance. The elongation shall be measured in accordance with JIS K 6402 with a sample having a thickness of 10 mm having a dumbbell form of No. 2, and a testing speed of 300 mm/min.

The porous structure has a compression repulsive force of 0.2 kgf or more, preferably 0.7 kgf or more. When the porous structure has a compression repulsive force of less than 0.2 kgf, the resulting plastic eraser has not sufficient stiffness, and resulting in difficulty in providing high elasticity. The compression repulsive force shall be measured as a value which is measured by pressing a disk having a diameter of 15.2 mm onto a sample having a thickness of 10 mm and compressing the sample by 5 mm at a rate of 7 mm/min.

As set forth above, according to the invention, it is preferred that the porous structure has a tensile strength of 3 kgf/cm$^2$ or less, an elongation of 500% or less, and a compression repulsive force of 0.2 kgf or more. The organic polymer which forms the porous structure includes, for example, thermosetting resins such as melamine resin, epoxy resin, urethane resin, urea resin, and phenolic resin, thermoplastic resins such as styrenic resin, e.g., polystyrene, ester resin, e.g., polyester, acrylic resin, e.g., polyacrylic acid ester, olefin resin, e.g., polyethylene, vinyl chloride resin, e.g., polyvinyl chloride, rubbers, e.g., natural rubber, styrene butadiene rubber, and nitrile-butadiene rubber, can be mentioned.

According to the invention, in particular, a porous structure which is formed of melamine resin, urethane resin, olefin resin, or vinyl chloride resin, for example, and which is hard and fragile, and has communication pores (open cells) is preferably used. Such a porous structure formed of organic polymers mentioned above is commercially available as a resin foam. For example, a porous structure formed of melamine resin is available as "Basotect" from BASF A.G. A porous structure formed of urethane resin is available as "MF-50" from Inoac Corp. A porous structure formed of ethylene resin is available as "OPECELL LC-300" from Sanwa Kako K.K.

The method for producing the plastic eraser composite body of the invention is not particularly limited. As an example, a porous structure formed of organic polymer is impregnated with a plastisol of vinyl chloride resin which contains various additives mentioned above if necessary, to fill the pores of the porous structure with the plastisol, heated to cure the plastisol, cooled, and the resulting cured product is cut to a suitable length, thereby providing a plastic eraser composite body of the invention.

In the method mentioned above, the plastisol is heated and cured usually at a temperature in the range of 100-160° C. for a period of 10-50 minutes.

When a plastic eraser composite body is to be produced by a method mentioned above, it is preferred to use a plastisol having a viscosity in the range of 100-20000 mPa·s, preferably in the range of 800-7000 mPa·s as measured using a Brookfield viscometer under the conditions of a rotational speed of 6 rpm at a temperature of 20° C. The pores of the porous structure can be easily impregnated with such a plastisol at ordinary temperature.

The thus obtained plastic eraser composite body has a hardness in the ranges of 55-75 and a gel hardness in the range of 3.0-6.0 kgf, and it is tough and yet it is less liable to crack, and in addition, it has a high erasing performance.

As mentioned above, the plastic eraser composite body of the invention is tough and yet it is less liable to crack, and in addition, it has a high erasing performance, and it has a good feeling is use. Of course, the scraps of the plastic eraser composite body can be easily integrated.

It is further preferred that the plastic eraser composite body of the invention has a coefficient of friction of 0.8 or less so that it has light touch when used in erasing, and the wear rate is 1% or more so that it is less susceptible to stain on the surface and has a high erasing performance when used in erasing.

In the production of plastic eraser composite body, the invention has many advantages particularly in using the combination of 95 to 40% by weight of 4,5-epoxy-1,2-cyclohexanedicarboxylic acid bis(2-ethylhexyl) and 5-60% by weight of diethylene glycol dibenzoate as a plasticizer together with a vinyl chloride resin.

That is, the use of the combination of the plasticizers together with a vinyl chloride resin according to the invention can lower the temperature at which a plastisol is cured by about 3° C., as compared with the use of a plastisol which comprises a phthalate plasticizer such as octyl phthalate or benzyl phthalate. Moreover, the porous structure formed of an organic polymer can be readily impregnated with such a plastisol comprising a vinyl chloride resin and the combination of plasticizers, and hence the plastic eraser can be produced at a high productivity.

For example, the porous structure formed of an organic polymer can be readily and fully impregnated with the plastisol which comprises a vinyl chloride resin and the combination of plasticizers at ordinary pressure within a short period of time with no need to make the atmosphere vacuum.

EXAMPLES

The invention is described in detail with reference to examples below, but the invention is not limited to these examples.

Example 1

As shown in Table 1, 31.7 parts by weight of polyvinyl chloride (Zest P 21 available from Shin Daiichi Vinyl Chloride K.K), 43.7 parts by weight of 4,5-epoxy-1,2-cyclohexanedicarboxylic acid bis(2-ethylhexyl) (Monocizer W-150 available from Dainippon Ink & Chemicals, Inc. and 4.9 parts by weight of diethylene glycol dibenzoate (Monocizer PB-3A available from Dainippon Ink & Chemicals) as a combination of plasticizers, and 19.8 parts by weight of calcium carbonate (heavy calcium carbonate available from Bihoku Funkako K.K.) were mixed together and stirred to provide a plastisol.

The plastisol was filled in the mold, preheated at 100° C. for 20 minutes, and then heated at 116° C. for 30 minutes.

Then, the mold was cooled, and the resulting gelled product was taken out of the mold and cut thereby providing a plastic eraser.

The hardness, the gel hardness, and the erasing rate of the obtained plastic eraser are shown in Table 1. Each of the numerals of the hardness, the gel hardness, and the erasing rate shown was a mean of values obtained in three times measurement. The method of measuring the hardness, gel hardness, and the erasing rate of a plastic rubber is as follows.
(Hardness of Plastic Eraser)
Measured according to JIS S 6050.
Gel Hardness of Plastic Eraser)
A disc-like sample 5 mm in thickness and 10 mm in diameter was prepared. A rod 4.4 mm in diameter was pressed against the center of the sample at a rate of 7 mm/minute. The load observed when the portion at which the rod was pressed was fractured was taken as the gel hardness. The measuring instrument used was a gel hardness scale available from Aikoh Engineering K.K.
(Erasing Rate of Plastic Eraser)
Measured according to JIS S 6050.

Examples 2 and 3

Using the same polyvinyl chloride, 4,5-epoxy-1,2-cyclohexanedicarboxylic acid bis(2-ethylhexyl), diethylene glycol dibenzoate, and calcium carbonate as those used in Example 1, each in an amount shown in Table 1, plastic erasers were produced in the same manner as Example 1. The hardness, the gel hardness, and the erasing rate of the resulting plastic erasers are shown in Table 1.

Comparative Examples 1 and 2

Using the same polyvinyl chloride, 4,5-epoxy-1,2-cyclohexanedicarboxylic acid bis(2-ethylhexyl), diethylene glycol dibenzoate, and calcium carbonate as those used in Example 1, each in an amount shown in Table 1, plastic erasers were produced in the same manner as Example 1. The hardness, the gel hardness, and the erasing rate of the resulting plastic erasers are shown in Table 1.

TABLE 1

|  | Examples | | | Comparative | |
| --- | --- | --- | --- | --- | --- |
|  | 1 | 2 | 3 | 1 | 2 |
| Ingredients of Plastic Erasers (parts by weight) | | | | | |
| Plasticizer 1 | 65.52 | 58.16 | 43.68 | 72.80 | 0.00 |
| Plasticizer 2 | 7.28 | 14.64 | 29.12 | 0.00 | 72.80 |
| Polyvinyl chloride | 47.49 | 47.49 | 47.49 | 47.49 | 47.49 |
| Calcium carbonate | 29.71 | 29.71 | 29.71 | 29.71 | 29.71 |
| Property and Performance of Plastic Erasers | | | | | |
| Surface Hardness | 62.30 | 63.30 | 63.80 | 63.80 | 64.50 |
| Gel Hardness (kgf) | 4.20 | 4.70 | 5.40 | 2.90 | 7.50 |
| Erasing Rate (%) | 94.30 | 94.40 | 92.60 | 94.70 | 90.19 |

As clear from the results shown in Table 1, the plastic erasers of the invention have a hardness in the range of 55-75, a gel hardness in the range of 3.0-6.0 kgf, are tough, less liable to crack, and have a high erasing rate. In contrast, the plastic eraser of Comparative Example 1 has a small gel hardness, and is liable to crack when used in erasing. The plastic eraser of Comparative Example 2 has a high gel hardness, and a low erasing rate.

Example 4

Evaluation of Impregnating Ability of Plastisol with Porous Structure

A bottomed plate-like mold was filled with the plastisol prepared in Example 1 at a temperature of 25° C. A sheet of porous structure having a thickness of 10 mm and a porosity of 98% and formed of melamine resin was put on the mold. It was found that 5 minutes were needed until the sheet was impregnated with the plastisol up to the surface of the sheet.

Octyl phthalate, acetyltributyl citrate, and an alkylsulfonic acid phenyl were used in an amount of 48.6 parts by weight, respectively, in place of the combination of 4,5-epoxy-1,2-cyclohexanedicarboxylic acid bis(2-ethylhexyl) and diethylene glycol dibenzoate as a plasticizer, plastisols were prepared in the same manner as in Example 1. Then, the times needed for the porous structure to be impregnated with each of the plastisols were found to be 7 minutes, 15 minutes, and 17 minutes, respectively.

Accordingly, it was found that by the use of the combination of 4,5-epoxy-1,2-cyclohexanedicarboxylic acid bis(2-ethylhexyl) and diethylene glycol dibenzoate as a plasticizer, the porous structure was able to be impregnated with the plastisol more promptly as compared with the cases in which the other plastisols inclusive of the above exemplified were used.
(Evaluation of Gelling Properties of Plastisol)

It was found that the plastisol prepared in Example 1 was charged in a mold, preheated at a temperature of 100° C. for 20 minutes, and then heated at a temperature of 116° C. for 30 minutes, thereby the plastisol was cured.

Octyl phthalate was used in an amount of 48.6 parts by weight in place of the combination of 4,5-epoxy-1,2-cyclohexanedicarboxylic acid bis(2-ethylhexyl) and diethylene glycol dibenzoate as a plasticizer, and a plastisol was prepared in the same manner as in Example 1. It was found that the plastisol was charged in a mold, preheated at a temperature of 100° C. for 20 minutes, and then heated at a temperature of 119° C. for 30 minutes, thereby the plastisol was cured.

Accordingly, it was found that by the use of the combination of 4,5-epoxy-1,2-cyclohexanedicarboxylic acid bis(2-ethylhexyl) and diethylene glycol dibenzoate as plasticizers, the resulting plastisol was cured at a lower temperature as compared with the case in which octyl phthalate was used as a plasticizer.

The invention claimed is:

1. A plastic eraser comprising a vinyl chloride resin as a base resin and a combination of 4,5-epoxy-1,2-cyclohexanedicarboxylic acid bis(2-ethylhexyl) and diethylene glycol dibenzoate as plasticizers, wherein the plastic eraser comprises the base resin in an amount of 25-60% by weight and the combination of plasticizers in an amount of 30-60% by weight, and wherein the proportion of the diethylene glycol dibenzoate in the combination of plasticizers is 5-60% by weight, and wherein the plastic eraser has a hardness in the range of 55-75, and a gel hardness in the range of 3.0-6.0 kgf.

2. The plastic eraser according to claim 1 which comprises the combination of plasticizers in an amount of 35-55% by weight.

3. The plastic eraser according to claim 1 in which the proportion of diethylene glycol dibenzoate in the combination of plasticizers is 10-50% by weight.

4. A plastic eraser composite body which comprises a porous structure formed of an organic polymer and having pores therein, and the plastic eraser according to claim 1 contained in the pores.

5. A method for producing the plastic eraser composite body according to claim 4, which comprises impregnating a porous structure formed of an organic polymer and having pores therein with a plastisol to fill the pores with the plastisol, and heating the resulting product to cure the plastisol, wherein the plastisol comprises a vinyl chloride resin as a base resin in an amount of 25-60% by weight and a combination of 4,5-epoxy-1,2-cyclohexanedicarboxylic acid bis(2-ethylhexyl) and diethylene glycol dibenzoate as plasticizers in an amount of 30-60% by weight, and wherein the proportion of the diethylene glycol dibenzoate in the combination of plasticizers is 5-60% by weight.

* * * * *